(12) United States Patent
Kim et al.

(10) Patent No.: US 12,085,050 B2
(45) Date of Patent: Sep. 10, 2024

(54) SWITCHING FUEL RAIL FOR A DIESEL FUEL ENGINE

(71) Applicant: Caterpillar Inc., Peoria, IL (US)

(72) Inventors: Hoisan Kim, Dunlap, IL (US); Arnold Myoungjin Kim, Peoria, IL (US); Dana Ray Coldren, Secor, IL (US); Eric Lee Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/049,719

(22) Filed: Oct. 26, 2022

(65) Prior Publication Data

US 2024/0141857 A1    May 2, 2024

(51) Int. Cl.
   *F02M 55/02*    (2006.01)
   *F02D 19/06*    (2006.01)

(52) U.S. Cl.
   CPC ....... *F02M 55/025* (2013.01); *F02D 19/0613* (2013.01); *F02D 19/0694* (2013.01)

(58) Field of Classification Search
   CPC .............. F02M 55/025; F02D 19/0613; F02D 19/0694
   See application file for complete search history.

(56) References Cited

U.S. PATENT DOCUMENTS

| 4,446,830 | A  |   | 5/1984  | Simko et al.  |              |
|-----------|----|---|---------|---------------|--------------|
| 7,225,787 | B2 | * | 6/2007  | Bromberg      | F02D 19/0655 |
|           |    |   |         |               | 123/198 A    |
| 8,985,089 | B2 |   | 3/2015  | Gray et al.   |              |
| 2010/0063712 | A1 | * | 3/2010 | Bromberg     | F02D 19/081  |
|           |    |   |         |               | 701/111      |
| 2011/0011382 | A1 | * | 1/2011 | Lippa        | F02D 19/0655 |
|           |    |   |         |               | 123/575      |
| 2011/0137537 | A1 | * | 6/2011 | Leone        | F02D 19/0628 |
|           |    |   |         |               | 123/3        |
| 2013/0333668 | A1 | * | 12/2013 | Coldren     | F02M 37/04   |
|           |    |   |         |               | 123/456      |
| 2018/0058348 | A1 | * | 3/2018 | Berkemeier   | F02M 37/04   |

FOREIGN PATENT DOCUMENTS

| CN | 213807910 U |   | 7/2021  |
| CN | 113294253 A |   | 8/2021  |
| CN | 113339153 A |   | 9/2021  |
| CN | 214944586 U |   | 11/2021 |
| EP |    1255923 B1 | 4/2006 |

* cited by examiner

*Primary Examiner* — Syed O Hasan
(74) *Attorney, Agent, or Firm* — Lee & Hayes, P.C.

(57) ABSTRACT

An internal combustion engine system is described herein. The system uses a switching rail in combination with a first fuel rail to operate the internal combustion engine of the system. The first fuel rail receives the first fuel for combustion within one or more of the combustion cylinders of the internal combustion engine. The switching rails are configured to receive either the first fuel or a second fuel. A controller is used to operate a switching valve that, depending on the position of the switching valve, routes or directs either the second fuel or the first fuel from their respective fuel tanks. In a switching condition, such as startup, shutdown, or when the second fuel is not available, the controller can use the first fuel as the alternate source of fuel provided through the switching rail.

20 Claims, 7 Drawing Sheets

SWITCHING FUEL RAIL FOR A DIESEL FUEL ENGINE

TECHNICAL FIELD

The present disclosure relates to diesel fuel engines, and more particularly, to the use of a switchable fuel rail to modify the operation of the engine.

BACKGROUND

The internal combustion engine is widely used in various industries. Internal combustion engines can operate on a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. Further, in pilot-ignited applications, including dual fuel applications, a mixture of a gaseous, second fuel, such as natural gas and air, is delivered into a cylinder and ignition is triggered using a relatively small direct injection of a first fuel of a compression ignition fuel which autoignites to trigger ignition of the relatively larger main charge of second fuel.

However, during various uses or configurations of the engine, the use of the second fuel may be disadvantageous, or the second fuel may be unavailable for use. Some efforts have been made to provide for the continued use of a combustion engine when a second fuel, such as methanol, is not desirable or possible. For example, Chinese Patent Application No. CN213807910 to Yingjun et al. (hereinafter "the '910 application") describes a system configured use both a second fuel and a first fuel. The system of the '910 application uses a single-nozzle injector that can receive either methanol or diesel. The '910 application describes the use of a controller that directs diesel or methanol into the single-nozzle injector. However, the system described in the '910 application is not directed to an internal combustion engine that can use both a second fuel and a first fuel to ignite the second fuel.

Examples of the present disclosure are directed to overcoming deficiencies of such systems.

SUMMARY

In one aspect of the presently disclosed subject matter, an internal combustion engine includes a plurality of combustion cylinders, each of the plurality of combustion cylinders having a pilot injector for injecting a first fuel into each of the plurality of combustion cylinders and a primary injector for injecting a second fuel into each of the plurality of combustion cylinders, a first fuel supply of the first fuel, a second fuel supply of the second fuel, wherein the second fuel is ignitable in the plurality of combustion cylinders based on a compression-ignition of the first fuel, a first fuel rail for providing the first fuel to the pilot injector of each of the plurality of combustion cylinders, a switching rail configured to provide either the second fuel or the first fuel to the primary injector of each of the plurality of combustion cylinders, and a switching valve configurable to route the second fuel from a second fuel tank or the first fuel from a first fuel tank to primary feed lines of the switching rails.

In another aspect of the presently disclosed subject matter, a method of operating an internal combustion engine includes monitoring, by a controller, the internal combustion engine, detecting, by the controller, a switching condition, modifying, by the controller, a switching rail from receiving a second fuel to receiving a first fuel, detecting, by the controller, that the switching condition has cleared, and modifying, by the controller, the switching rail from receiving the first fuel to receiving the second fuel.

In a still further aspect of the presently disclosed subject matter, a controller for controlling an internal combustion engine includes a memory storing computer-executable instructions, and a processor in communication with the memory, the computer-executable instructions causing the processor to perform acts comprising monitoring the internal combustion engine, detecting a switching condition, modifying a switching rail from receiving a second fuel to receiving a first fuel, detecting that the switching condition has cleared, and modifying the switching rail from receiving the first fuel to receiving the second fuel.

DETAILED DESCRIPTION

Figure 1:
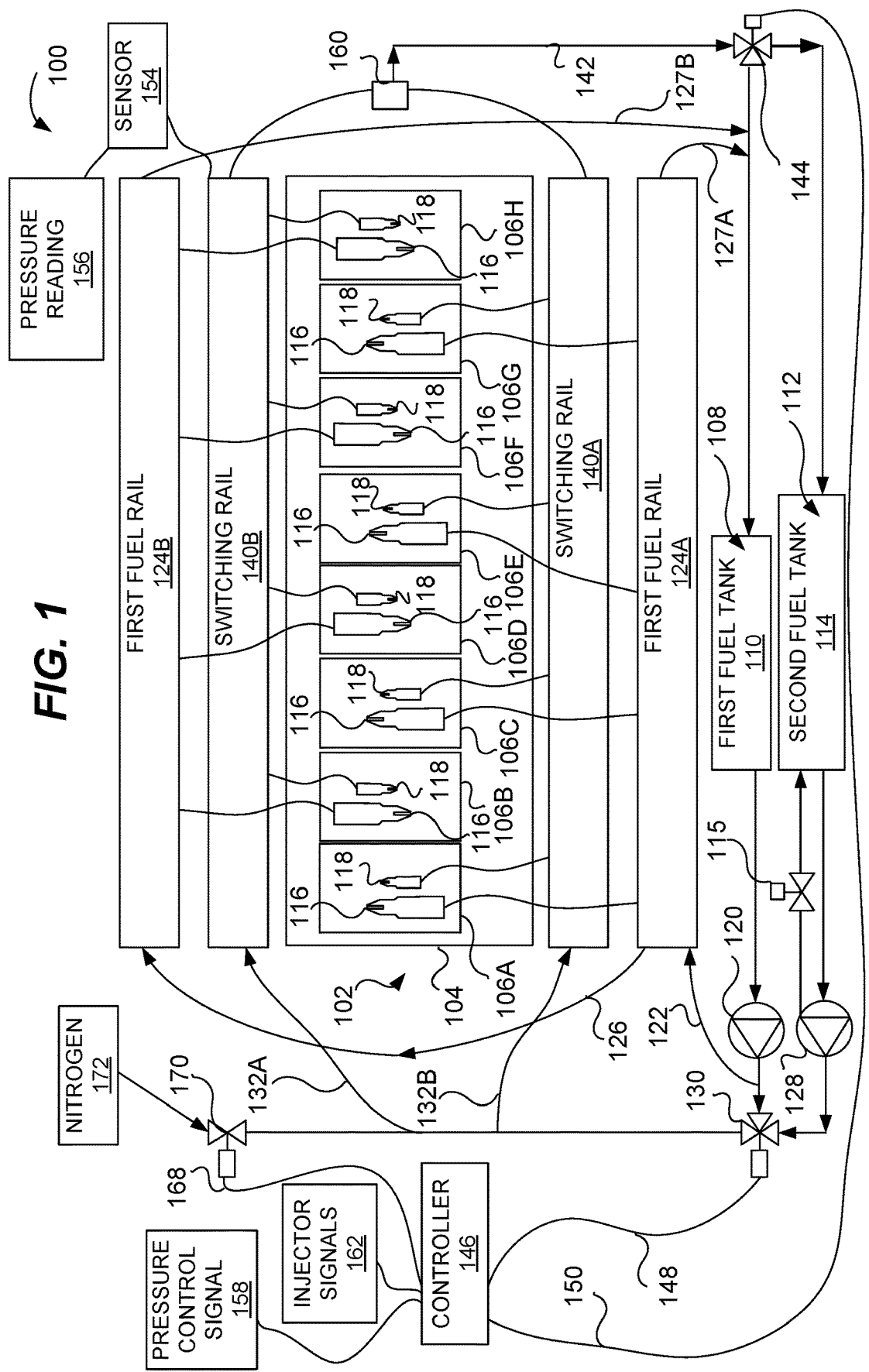
FIG. 1 illustrates an internal combustion engine system using a switchable fuel rail, in accordance with various embodiments of the presently disclosed subject matter.

Wherever possible, the same reference numbers will be used throughout the drawings to refer to the same or like parts. FIG. 1 illustrates an internal combustion engine system 100 using a switchable fuel rail, in accordance with various embodiments of the presently disclosed subject matter. The internal combustion engine system 100 includes an internal combustion engine 102 having a cylinder block 104. A plurality of combustion cylinders 106A-106G (hereinafter referred to individually as "the combustion cylinder 106A," "the combustion cylinder 106B," and the like, and collectively as "the combustion cylinders 106,") are formed in cylinder block 104, and can have any suitable arrangement such as a V-pattern, an inline pattern, or still others, and may have any number of combustion cylinders 106. It will be understood that the combustion cylinders 106 are associated with a piston (not shown) movable between a top dead center position and a bottom dead center position in a generally conventional manner, typically in a four-stroke engine cycle. The pistons will be coupled with a crankshaft (not shown) rotatable to provide torque for purposes of vehicle propulsion, operating a generator for production of electrical energy, or in still other applications such as operating a compressor, a pump, or various other types of equipment.

The internal combustion engine 102 is fueled by a first fuel 108 stored in a first fuel tank 110 and a second fuel 112 stored in a second fuel tank 114. A second tank shutoff valve 115 can be opened and close to allow the flow or abate the flow of the second fuel 112 from the second fuel tank 114. The first fuel 108 may include a higher cetane/lower octane liquid fuel, and the second fuel 112 may include a lower cetane/higher octane liquid fuel. The terms "higher" and "lower" in this context may be understood as relative terms in relation to one another. Thus, the first fuel 108 may have a higher cetane number and a lower octane number than a cetane number and an octane number of the second fuel 112. The first fuel 108 might include a diesel distillate fuel, dimethyl ether, biodiesel, Hydrotreated Vegetable Oil (HVO), Gas to Liquid (GTL) renewable diesel, any of a variety of liquid fuels with a cetane enhancer, or still another fuel type. The second fuel 112 may include an alcohol fuel such as methanol or ethanol, Naphtha, for example, or still other fuel types. For the purposes of FIG. 1, the first fuel 108 is described as diesel fuel and the second fuel 112 is described as methanol, though as noted above, the presently disclosed subject matter may be used with other fuel types.

Each of the combustion cylinders 106 includes pilot injectors 116 and primary injectors 118. It should be noted that the presently disclosed subject matter is not limited any particular size, type, or relative size between the pilot injectors 116 and the primary injectors 118. In various examples, the first fuel 108 is supplied to the pilot injectors 116 from the first fuel tank 110, through pilot pump 120, into pilot feed line 122 and into a first fuel rail 124A. The first fuel 108 is also provided to all the combustion cylinders 106 through crossover feed line 126 to a first fuel rail 124B. Unused first fuel 108 is transferred back to the first fuel tank 110 through first fuel return lines 127A and 127B. It should be noted that the first fuel rails 124A and 124B are illustrated as separate rails. In some examples, the first fuel rails 124A and 124B are one or more rails that provide the first fuel 108 to the pilot injectors 116. As used herein, a "rail" is a fuel line that supplies fuel to injectors, such as the pilot injectors 116. It should further be noted that the pilot injector 116 and the primary injector 118 can be a single injector capable of receiving both the first fuel 108 and the second fuel 112 or multiple injectors with each capable of receiving either of the first fuel 108 or the second fuel 112, or combinations thereof. An example of a multiple injector configuration is illustrated in more detail in FIG. 2, below.

Figure 2:
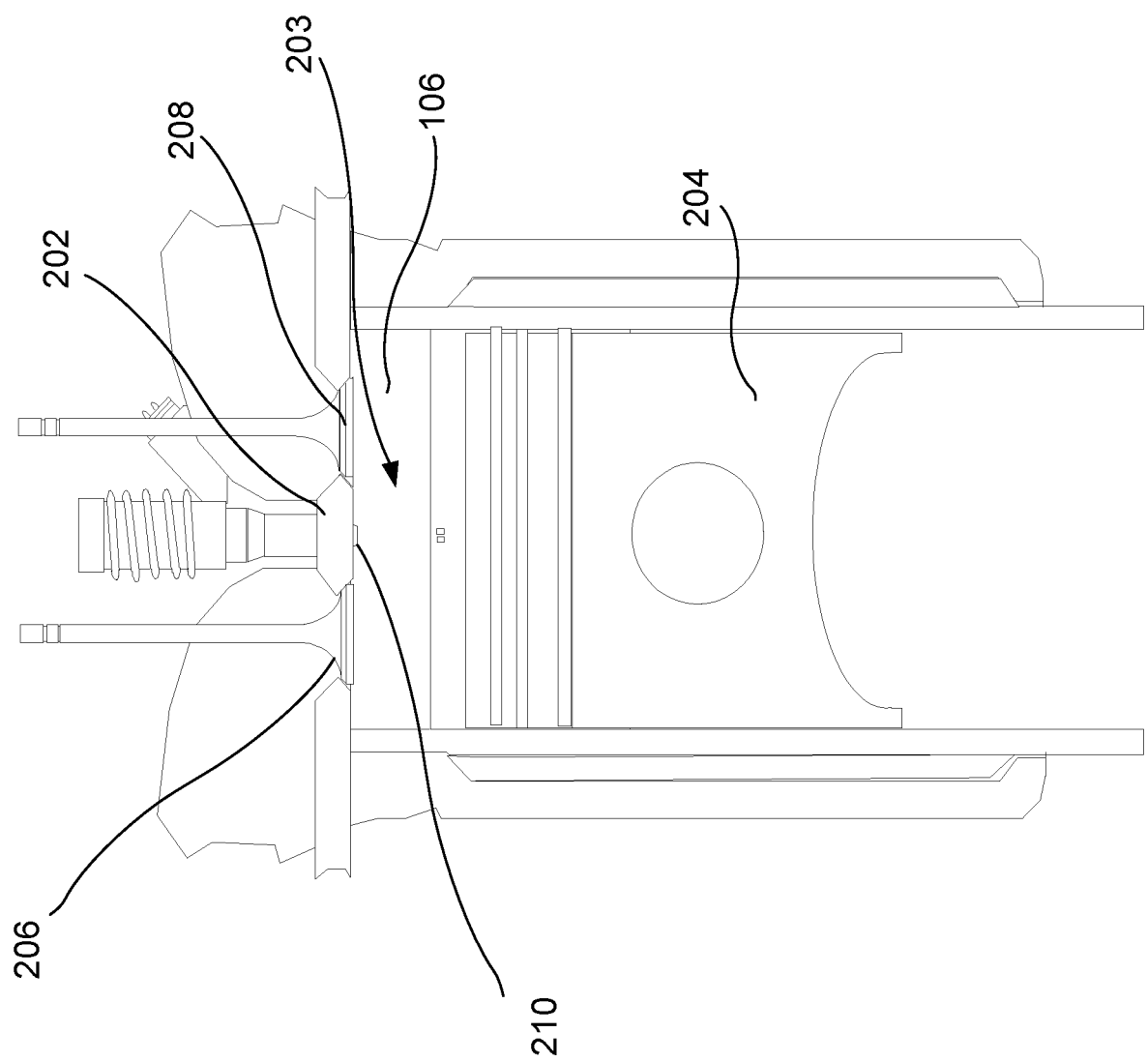
FIG. 2 is a side view of a multiple injector configuration for a pilot injector and a primary injector, in accordance with various embodiments of the presently disclosed subject matter.

FIG. 2 is a side view of a multiple injector configuration for the pilot injector 116 and the primary injector 118, in accordance with various embodiments of the presently disclosed subject matter. As shown is injector body 202 that injects the first fuel 108 and the second fuel 112 into an inner volume 203 of the cylinder 106. The compression from a piston 204 is used to ignite the first fuel 108 which in some examples readily ignites due to a relatively higher cetane number than other fuels. Relatively higher temperatures created during combustion of the first fuel 108 then provide a sufficient temperature to combust the second fuel 112, which may not readily compressively ignite due to a relatively lower cetane number. One or more intake valves 206 and one or more exhaust valves 208 provide for the intake of air and the exhaust of combustion products, respectively, from the cylinder 106, explained in more detail in FIG. 4, below. To provide both the first fuel 108 and the second fuel 112 into the cylinder 106, the injector body 202 includes the pilot injector 116 and the primary injector 118 at surface 210 inside the inner volume of the cylinder 106, illustrated in more detail in FIG. 3, below.

Figure 3:
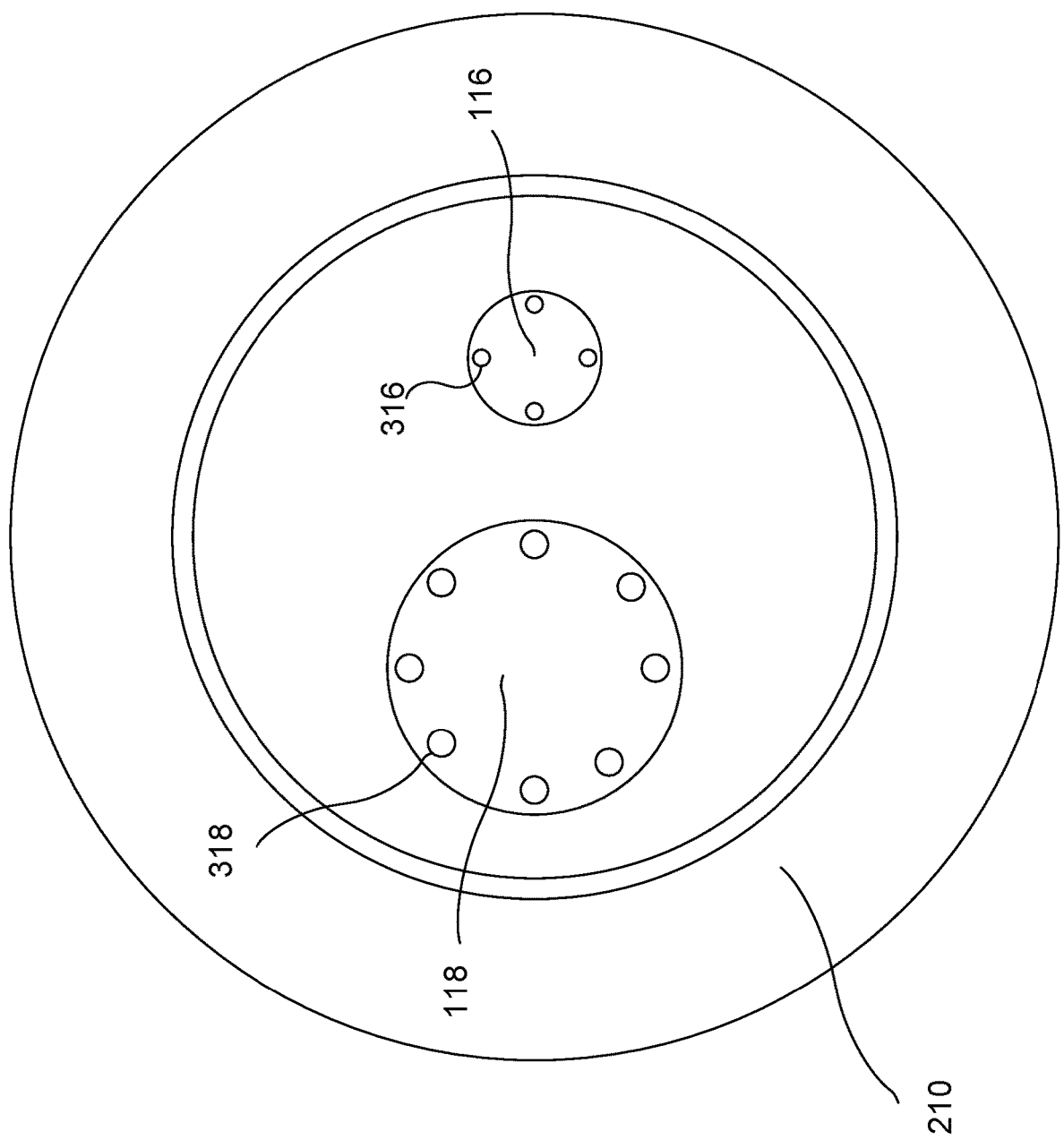
FIG. 3 illustrates a pilot injector and a primary injector at a surface inside an inner volume of a cylinder, in accordance with various embodiments of the presently disclosed subject matter.

FIG. 3 illustrates the pilot injector 116 and the primary injector 118 at surface 210 inside the inner volume 203 of the cylinder 106, in accordance with various embodiments of the presently disclosed subject matter. The pilot injector 116 has one or more injector ports, illustrated by way of example as injector port 316, that route the first fuel 108 into the inner volume 203 of the cylinder 106. The primary injector 118 has one or more injector ports, illustrated by way of example as injector port 318, that route the first fuel or the second fuel 112 into the inner volume 203 of the cylinder 106, explained in further detail in FIG. 1. These injector ports can be arranged on the outside of a semi-spherical tip which protrudes from surface 210 in order to allow the fuel sprays to be angled into the bowl.

Returning to FIG. 1, the second fuel 112 is provided to the primary injectors 118 from the second fuel tank 114, through primary pump 128, switching valve 130, primary feed lines 132A and 132B, and into the switching rails 140A and 140B. It should be noted that the switching rails 140A and 140B are illustrated as separate rails. In some examples, the switching rails 140A and 140B are one or more rails that provide the second fuel 112 to the primary injectors 118. Unused second fuel 112 returns to the second fuel tank 114 via primary return line 142, through return valve 144, and back into the second fuel tank 114. In various examples, the first fuel 108 may be supplied to pilot injectors 116 at a relatively higher pressure, whereby the second fuel 112 may be supplied to primary injectors 118 at a relatively lower pressure. The second fuel 112 may be pressurized further prior to injection, such as within each of the primary injectors 118. The second fuel 112 will typically not be readily compression-ignitable at least relative to the first fuel 108, and relies for its ignition, and typically subsequent diffusion combustion, in the combustion cylinders 106 based upon the compression-ignition of the first fuel 108. In a typical application in any one fuel injection a quantity of the first fuel 108 will be less than a quantity of the second fuel 112, with the purpose of the first fuel 108 being substantially only for ignition purposes of the second fuel 112. The relative amounts of the first fuel 108 and the second fuel 112 can vary depending upon engine conditions. At lower engine speeds and lower engine loads a greater quantity of the first fuel 108, or a greater relative quantity of the first fuel 108, in a fuel charge may be used. At higher engine speeds and higher engine loads a lesser quantity, or lesser relative quantity of the first fuel 108, may be used, illustrated by way of example in FIG. 2.

Figure 4:
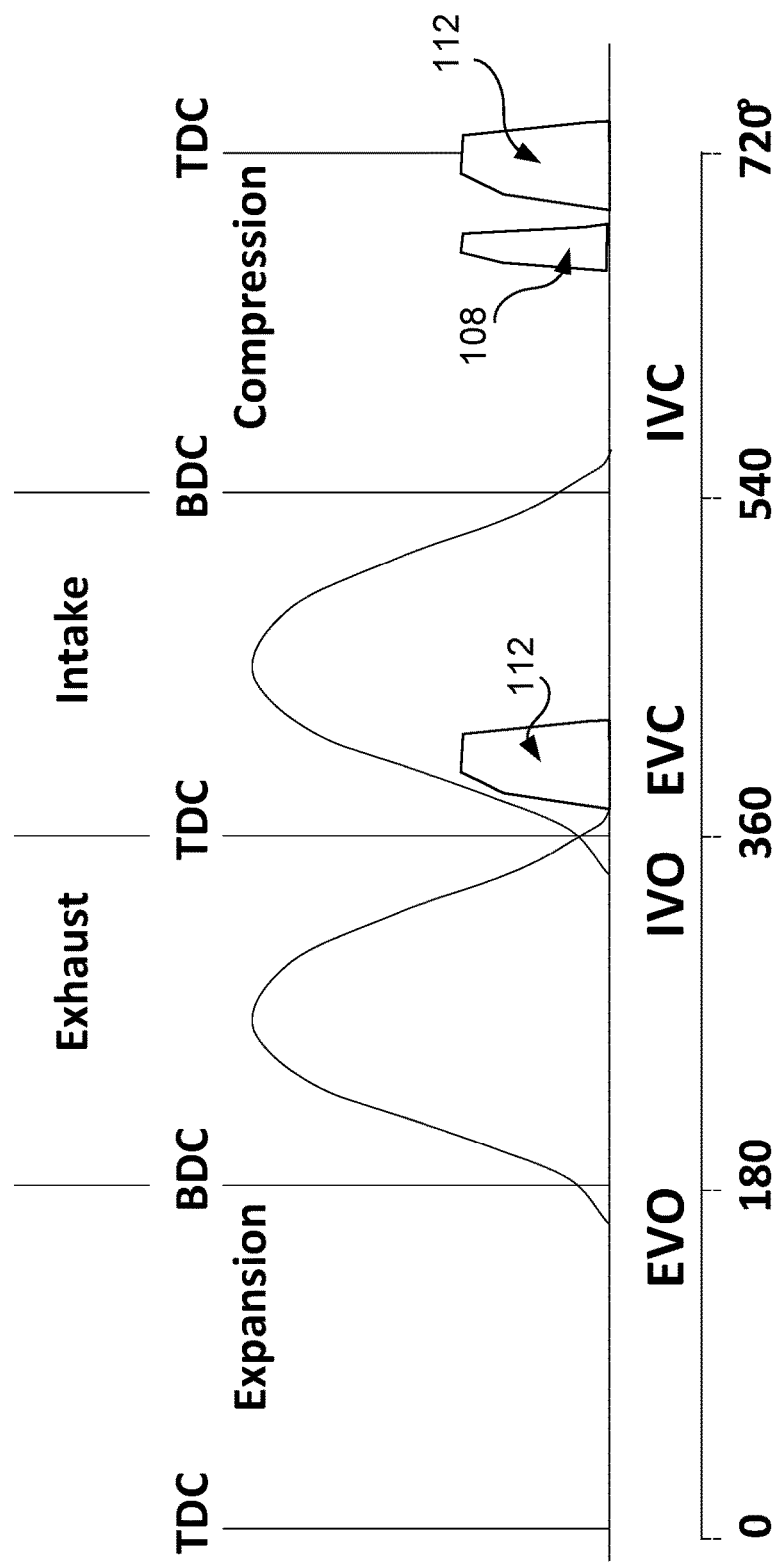
FIG. 4 is a timing diagram of an injection sequence of a four-stroke cycle in which first fuel is injected to assist with the combustion of second fuel, in accordance with various examples of the presently disclosed subject matter.

FIG. 4 is a timing diagram of an injection sequence of a four-stroke cycle in which the first fuel 108 is injected to assist with the combustion of the second fuel 112, in accordance with various examples of the presently disclosed subject matter. It should be noted that the timing diagram of FIG. 4 is merely for purposes of illustration and is not being provided as a limiting example. As illustrated in FIG. 4, one of the combustion cylinders 106 is moving from top dead center (TDC, at 0 degrees) into the expansion stroke (post combustion) from 0 degrees to 180 degrees, whereby the piston moves from TDC to bottom dead center (BDC). The exhaust valve opens at the end of the expansion stroke and remains open through the exhaust stroke. The exhaust valve closes, and an intake valve opens, at the end of the exhaust stroke. The intake valve stays open during the intake stroke.

Additionally, during the intake stroke, a portion of the second fuel 112 is injected. This first injection of second fuel 112 may only be required for low energy density fuels where the injection near TDC compression does not provide enough energy to achieve the desired engine power. The intake stroke is completed and the combustion cylinder 106 enters the compression stroke, whereby the intake valve is closed, and the piston moves to TDC. During the compression stroke, the first fuel 108 is injected prior the injection of the second fuel 112. There may be separation between these two injection events or the first fuel 108 may be injected immediately before or at the same time as the second fuel 112 is injected. As noted above, the purpose of the first fuel 108 is substantially for the ignition purposes of the second fuel 112. However, during various engine configurations, it may be desired to use the first fuel 108 in place of the second fuel 112, as illustrated further in FIG. 1.

Returning to FIG. 1, as noted above, there may be some examples in which it may be preferable or necessary to use the first fuel 108 as both the first fuel 108 and the second fuel 112. For example, in the instance of the second fuel 112 being methanol and the first fuel 108 being diesel, it may be desirable or necessary to use diesel only during a startup or shutdown phase. Further, if the second fuel 112 is unavailable, the use of the first fuel 108 may allow the continued use of the internal combustion engine system 100. In some examples, the pilot injectors 116 are smaller (i.e., inject less of a volume of liquid) than the primary injectors 118. Thus, even if the first fuel 108 was to be used only, the pilot injectors 116 may not provide the volumetric flow rate needed to support the operation of the internal combustion engine 102. In this situation, the switching rails 140A and 140B are used to provide the capability of using the primary injectors 118 with the first fuel 108 rather than the second fuel 112.

To switch from the use of the second fuel 112 in the switching rails 140A and 104B to the first fuel 108 from the first fuel tank 110, a controller 146 is used. The controller 146 opens and closes the switching valve 130 and the return valve 144 to switch from the use of the second fuel 112 in the switching rails 140A and 104B to the first fuel 108 from the first fuel tank 110. To switch the use, the controller 146 issues switching signal 148 to the switching valve 130 to switch from the intake of the second fuel 112 into the primary feed lines 132A and 132B to the intake of the first fuel 108 into the primary feed lines 132A and 132B. The switching valve 130 is three-way valve (such as a three-way ball valve) that, based on the switching signal 148, selectively receives the second fuel 112 or the first fuel 108. Once the first fuel 108 is selected by the controller 146, the first fuel 108 is received into the switching rails 140A and 140B and are injected into the combustion cylinders 106 through the primary injectors 118. In this configuration, the first fuel 108 is injected into both the primary injectors 118 and the pilot injectors 116, though at varying timing sequences, illustrated by way of example in FIG. 3.

Figure 5:
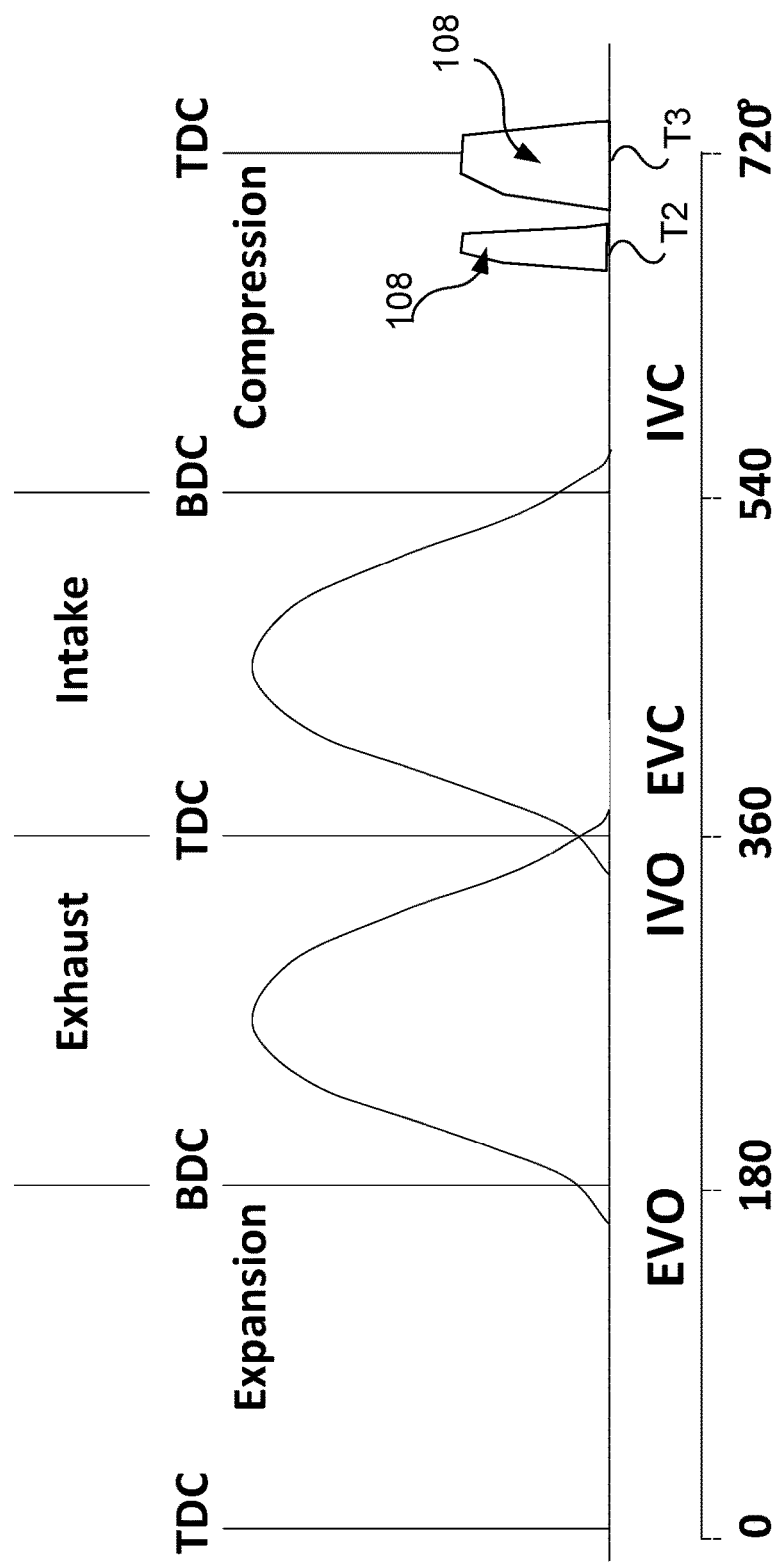
FIG. 5 is a timing diagram of an injection sequence of a four-stroke cycle in which first fuel is injected through both primary injectors and the pilot injectors, in accordance with various examples of the presently disclosed subject matter.

FIG. 5 is a timing diagram of an injection sequence of a four-stroke cycle in which the first fuel 108 is injected through both the primary injectors 118 and the pilot injectors 116 after the switching valve 130 is configured by the controller 146 to receive the first fuel 108 into the primary feed lines 132A and 132B rather than the second fuel 112, in accordance with various examples of the presently disclosed subject matter. It should be noted that the timing diagram of FIG. 5 is merely for purposes of illustration and is not being provided as a limiting example. As illustrated in FIG. 5, one of the combustion cylinders 106 is moving from top dead center (TDC at 0 degrees) into the expansion stroke (post combustion) from 0 degrees to 180 degrees, whereby the piston moves from TDC to bottom dead center (BDC). The exhaust valve opens at the end of the expansion stroke and remains open through the exhaust stroke. The exhaust valve closes, and an intake valve opens, at the end of the exhaust stroke. The intake valve stays open during the intake stroke. The intake stroke is completed and the combustion cylinder 106 enters the compression stroke, whereby the intake valve is closed, and the piston moves to TDC. The first fuel 108 is then injected at time T2 through the pilot injector 116, and thereafter the first fuel 108 is injected at time T3 through the primary injectors 118. The pilot injection T2 can be optional as the first fuel 108 in some examples can have a relatively high cetane index and therefore would readily compression ignite during primary injection T3. As noted above, the injection sequence illustrated in FIG. 5 may vary depending on the particular configuration of the system. For example, the times T2 and T3 may be adjusted to different portions of the compression cycle. In another example, the first fuel 108 may be injected with more or fewer injections. For example, the first fuel 108 may be injected at time T2, with no injection at time T3. In other examples, additional injections of first fuel 108 may be used and are considered to be within the scope of the presently disclosed subject matter. These and other variations may be used and are considered to be within the scope of the presently disclosed subject matter.

Returning to FIG. 1 and the configuration in which the switching valve 130 has been configured by the controller 146 to receive the first fuel 108 and direct the first fuel 108 into the switching rails 140A and 140B, the controller 146 has further reconfigured the internal combustion engine system 100. The controller 146 issues return valve control signal 150 to change the position of the return valve 144 from returning to the second fuel tank 114 to returning to the first fuel tank 110. Although it is expected that most, if not all, of the first fuel 108 provided to the switching rails 140A and 104B is used for combustion, additional first fuel 108 (and second fuel 112 if second fuel 112 is provided to the switching rails 140A and 104B) beyond that required may be provided to the first fuel tank 110. This may cause an overpressure condition in the switching rails 140A and 140B. To control pressure in the switching rails 140A and 140B, the controller 146 may interface with a pressure sensor 154. The pressure sensor 154 senses the pressure in the switching rails 140A and 140B and outputs a pressure reading 156, to be received by the controller 146. The controller 146 receives the pressure reading 156 and determines if the pressure is above a setpoint. If the pressure reading 156 is above a setpoint, the controller 146 transmits a pressure control signal 158 to a pressure valve 160. The pressure control signal 158 is configured to cause the pressure valve 160 to open, venting the switching rails 140A and 140B by allowing fuel (such as the second fuel 112 or the first fuel 108) to be released into their respective fuel tanks, i.e., the first fuel tank 110 if the switching rails 140A and 140B are configured to receive the first fuel 108 and the second fuel tank 114 if the switching rails 140A and 140B are configured to receive the second fuel 112.

The controller 146 is also used to control the injection sequence and timing of the pilot injectors 116 and the primary injectors 118, noted by way of example in FIG. 5. As discussed above, when switching from the use of the second fuel 112 to the first fuel 108 in the switching rails 140A and 140B, the difference in power and octane levels between the two fuels may require that the injection sequence and timing be adjusted. Thus, the controller 146, when configuring the internal combustion engine 102 to use the first fuel 108 in the switching rails 140A and 140B rather than the second fuel 112, transmits injector signal 162 to the pilot injectors 116 and the primary injectors 118. The injector signals 162 are used to instruct the pilot injectors 116 and the primary injectors 118 to open and close at various times and lengths of time based on the engine conditions as sensed by the controller 146.

The controller 146 could also be configured to assist in clearing the switching rails 140A and 140B of remaining second fuel 112 or first fuel 108, as may be required in a shutdown scenario if one of the fuels is of a volatile nature and safety considerations require purging of the switching rails 140A and 140B upon shutdown. Thus, an engine shutdown may be a switching condition. The controller 146 transmits gas control signal 168 to a gas valve 170. The gas control signal 168 is configured to open and close the gas valve 170, allowing an inert gas such as nitrogen 172 to enter the switching rails 140A and 140B at a pressure great enough to force remaining fuel in the switching rails 140A and 140B to be expelled to their respective fuel tanks. The controller 146 can be used in various situations, including the startup and shutdown of the internal combustion engine 102, illustrated by way of example in FIG. 6, below.

Figure 6:
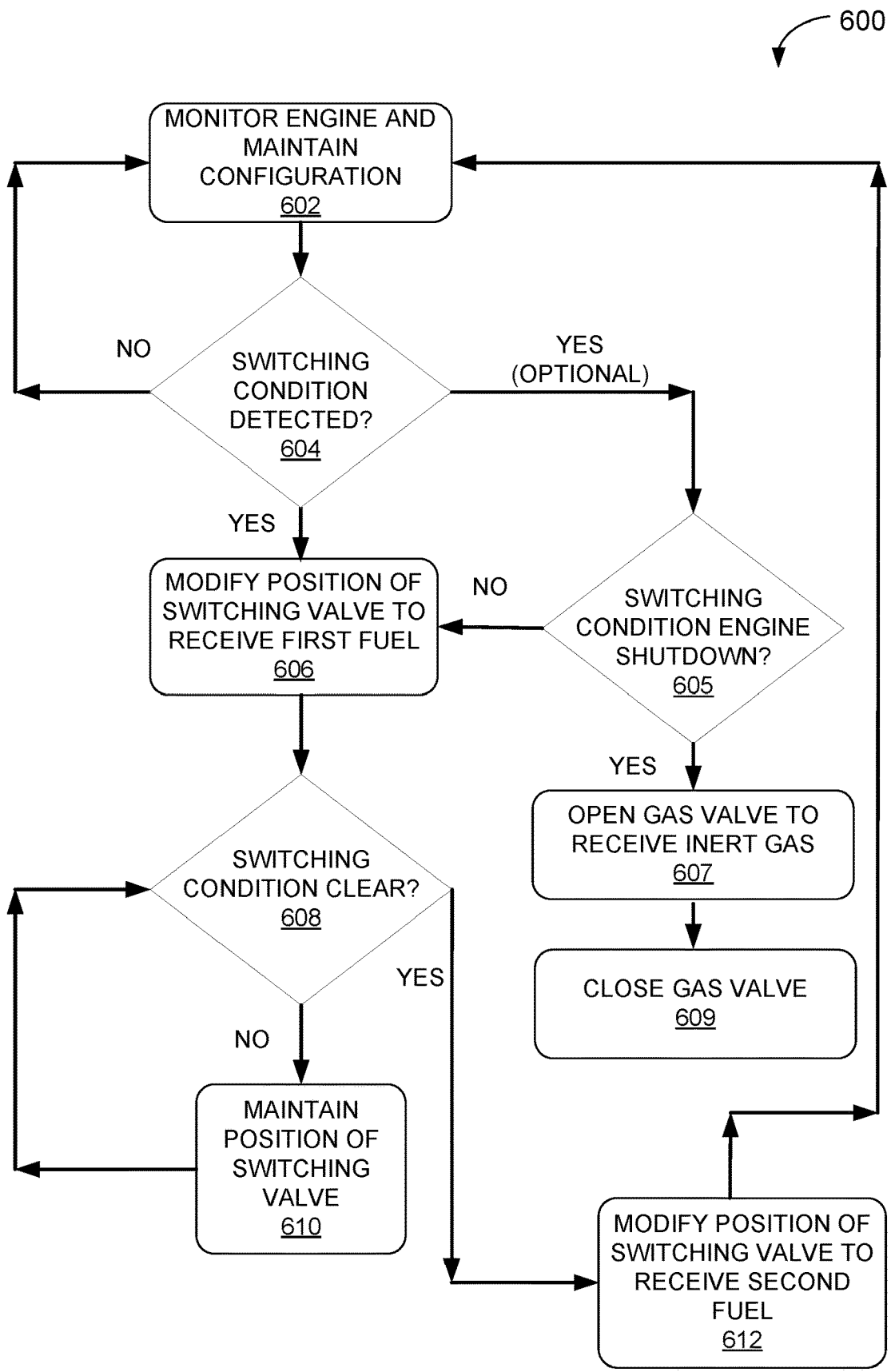
FIG. 6 illustrates a method for operating an internal combustion engine in which a controller switches an operation of switching rails, in accordance with various examples of the presently disclosed subject matter.

FIG. 6 illustrates a method 600 for operating the internal combustion engine 102 in which the controller 146 switches the operation of the switching rails 140A and 140B, in accordance with various examples of the presently disclosed subject matter. The method 600 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 600 commences at step 602, where the controller 146 monitors the internal combustion engine 102 and maintains the configuration of the internal combustion engine 102. The controller 146 can be part of an engine control module (ECM) or diesel control module (DCM) if the internal combustion engine 102 is a diesel engine. The controller 146 can also be a separate computing device from an ECM or DCM. The presently disclosed subject matter is not limited to either configuration.

At step 604, the controller 146 detects a switching condition. As used herein, a "switching condition" is a condition in which the switching rails 140A and 140B are to receive the first fuel 108 as the second fuel rather than the second fuel 112. A switching condition can be various conditions, such as, but not limited to, a startup of the internal combustion engine 102, a shutdown of the internal combustion engine 102, a loss of availability of the second fuel 112, a selection of the first fuel 108 to be used as the second fuel 112, a detection of a power output below a set power level of the internal combustion engine 102, a detection of an emission level of the internal combustion engine 102 above an acceptable emission level. If a switching condition is not detected by the controller 146, the method 600 continues at step 602.

If a switching condition is detected at step 604, at step 606, the controller 146 modifies the internal combustion engine 102 to use the first fuel 108 in the switching rails 140A and 140B. To switch the use, the controller 146 issues the switching signal 148 to the switching valve 130 to switch from the intake of the second fuel 112 into the primary feed lines 132A and 132B to the intake of the first fuel 108 into the primary feed lines 132A and 132B. Once the first fuel 108 is selected by the controller 146, the first fuel 108 is received into the switching rails 140A and 140B and are injected into the combustion cylinders 106 through the primary injectors 118. In this configuration, the first fuel 108 is injected into both the primary injectors 118 and the pilot injectors 116.

At step 608, the controller 146 determines if the switching condition has cleared. If at step 608 the controller 146 determines that the switching condition has not cleared, at step 610, the controller 146 maintains the position of the switching valve 130 so that the first fuel 108 is maintained as the fuel introduced into the switching rails 140A and 140B. For example, during a shutdown, the switching condition is maintained throughout shutdown to clear the second fuel 112 from the switching rails.

If at step 608 the controller 146 determines that the switching condition has cleared, at step 612, the controller 146 modifies the configuration of the internal combustion engine 102 so that the second fuel 112 is provided to the switching rails 140A and 140B. To switch the use, the controller 146 issues the switching signal 148 to the switching valve 130 to switch from the intake of the first fuel 108 into the primary feed lines 132A and 132B to the intake of the second fuel 112 into the primary feed lines 132A and 132B. Once the second fuel 112 is selected by the controller 146, the second fuel 112 is received into the switching rails 140A and 140B and are injected into the combustion cylinders 106 through the primary injectors 118. In this configuration, the second fuel 112 is injected into the primary injectors 118 and the first fuel 108 is injected into the pilot injectors 116. This may occur, for example, during a startup operation where during startup the first fuel 108 is used until the internal combustion engine 102 starts up, whereby the second fuel 112 is selected for steady state operations.

In some examples, if the internal combustion engine 102 is equipped with a purging system such as the gas valve 170 of FIG. 1, the method 600 can include an optional purge process (identified in FIG. 6 as steps 605, 607, and 609). In the optional purge process, if at step 604 a switching condition occurs, rather than continuing to the step 606 as described above, the controller 146, at step 605, determines if the switching condition is an engine shutdown. As noted above, in some examples, remaining fuel in one or more of the rails may need to be purged for safety or other reasons.

If at step 605 the controller 146 determines that the switching condition is not an engine shutdown, the method 600 continues to step 606 as describe above. If at step 605 the controller 146 determines that the switching condition is an engine shutdown, at step 607, the controller 146 issues the gas control signal 168 to cause the gas valve 170 to open, allowing an inert gas such as nitrogen 172 to enter the switching rails 140A and 140B at a pressure great enough to force remaining fuel in the switching rails 140A and 140B to be expelled to their respective fuel tanks. At step 609, the controller 146 issues the gas control signal 168 to close the gas valve 170.

Figure 7:
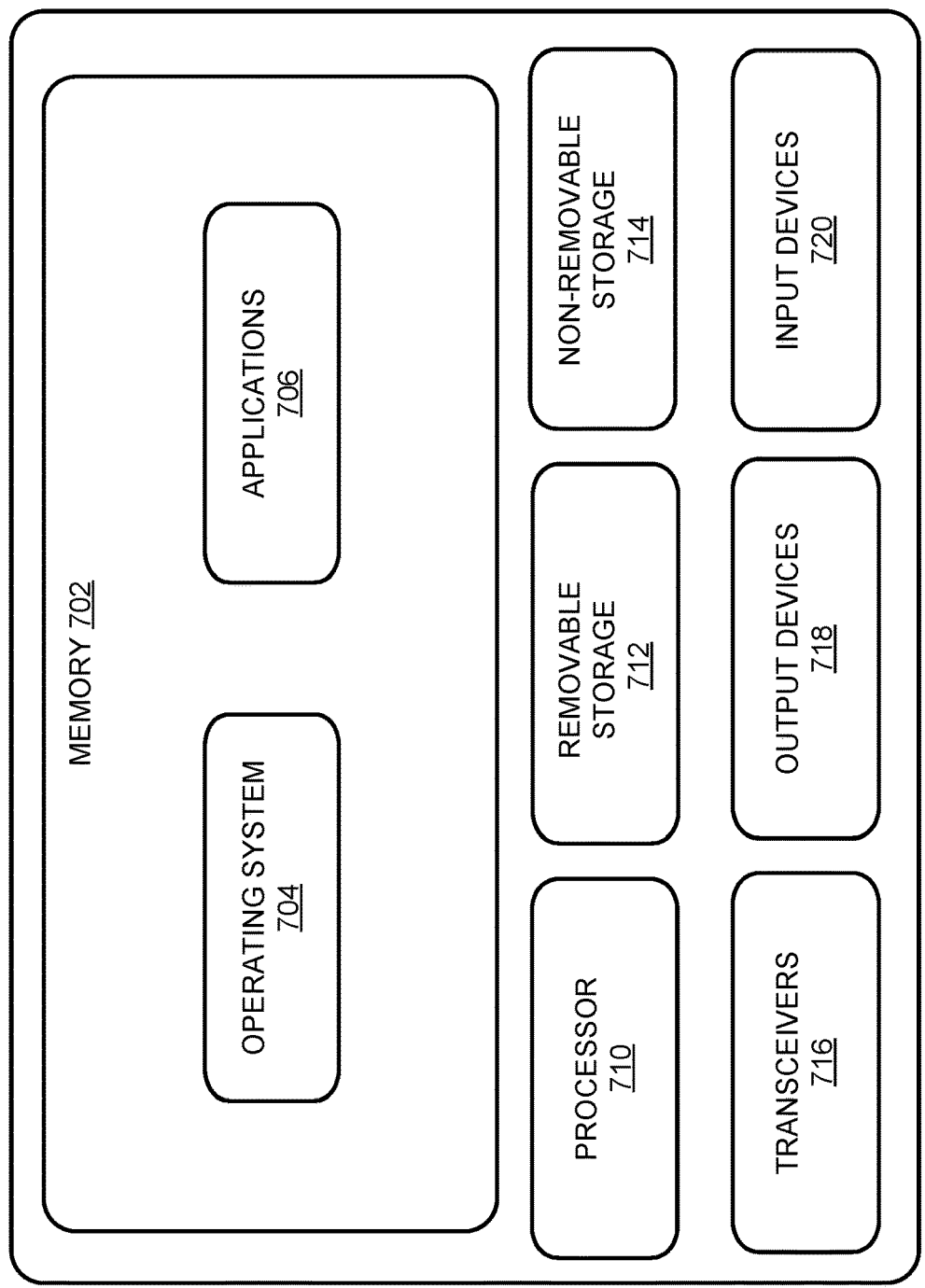
FIG. 7 depicts a component level view of a controller for use with the systems and methods described herein, in accordance with various examples of the presently disclosed subject matter.

FIG. 7 depicts a component level view of the controller 146 for use with the systems and methods described herein. The controller 146 could be any device capable of providing the functionality associated with the systems and methods described herein. The controller 146 can comprise several components to execute the above-mentioned functions. The controller 146 may be comprised of hardware, software, or various combinations thereof. As discussed below, the controller 146 can comprise memory 702 including an operating system (OS) 704 and one or more standard applications 706. The standard applications 706 may include applications that provide for receiving and determining the pressure reading 156, switching conditions of the internal combustion engine 102 and the like.

The controller 146 can also comprise one or more processors 710 and one or more of removable storage 712, non-removable storage 714, transceiver(s) 716, output device(s) 718, and input device(s) 720. In various implementations, the memory 702 can be volatile (such as random access memory (RAM)), non-volatile (such as read only memory (ROM), flash memory, etc.), or some combination of the two. The memory 702 can include data pertaining to operational pressure ranges of the switching rails 140A and 140B, and other information, and can be stored on a remote server or a cloud of servers accessible by the controller 146.

The memory 702 can also include the OS 704. The OS 704 varies depending on the manufacturer of the controller 146. The OS 704 contains the modules and software that support basic functions of the controller 146, such as scheduling tasks, executing applications, and controlling peripherals. The OS 704 can also enable the controller 146 to send and retrieve other data and perform other functions, such as transmitting control signals using the transceivers 716 and/or output devices 718 and receiving switching conditions using the input devices 720.

The controller 146 can also comprise one or more processors 710. In some implementations, the processor(s) 710 can be one or more central processing units (CPUs), graphics processing units (GPUs), both CPU and GPU, or any other combinations and numbers of processing units. The controller 146 may also include additional data storage devices (removable and/or non-removable) such as, for example, magnetic disks, optical disks, or tape. Such additional storage is illustrated in FIG. 7 by removable storage 712 and non-removable storage 714.

Non-transitory computer-readable media may include volatile and nonvolatile, removable and non-removable tangible, physical media implemented in technology for storage of information, such as computer readable instructions, data structures, program modules, or other data. The memory 702, removable storage 712, and non-removable storage 714 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 146. Any such non-transitory computer-readable media may be part of the controller 146 or may be a separate database, databank, remote server, or cloud-based server.

In some implementations, the transceiver(s) 716 include any transceivers known in the art. In some examples, the transceiver(s) 716 can include wireless modem(s) to facilitate wireless connectivity with other components (e.g., between the controller 146 and a wireless modem that is a gateway to the Internet), the Internet, and/or an intranet. Specifically, the transceiver(s) 716 can include one or more transceivers that can enable the controller 146 to send and receive data. Thus, the transceiver(s) 716 can include multiple single-channel transceivers or a multi-frequency, multi-channel transceiver to enable the controller 146 to send and receive video calls, audio calls, messaging, etc. The transceiver(s) 716 can enable the controller 146 to connect to multiple networks including, but not limited to 2G, 3G, 4G, 5G, and Wi-Fi networks. The transceiver(s) 716 can also include one or more transceivers to enable the controller 146 to connect to future (e.g., 6G) networks, Internet-of-Things (IoT), machine-to machine (M2M), and other current and future networks.

The transceiver(s) 716 may also include one or more radio transceivers that perform the function of transmitting and receiving radio frequency communications via an antenna (e.g., Wi-Fi or Bluetooth®). In other examples, the transceiver(s) 716 may include wired communication components, such as a wired modem or Ethernet port, for communicating via one or more wired networks. The transceiver(s) 716 can enable the controller 146 to facilitate audio and video calls, download files, access web applications, and provide other communications associated with the systems and methods, described above.

In some implementations, the output device(s) 718 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 718 can also include speakers, or similar devices, to play sounds or ringtones when an audio call or video call is received. Output device(s) 718 can also include ports for one or more peripheral devices, such as headphones, peripheral speakers, or a peripheral display.

In various implementations, input device(s) 720 include any input devices known in the art. For example, the input device(s) 720 may include a camera, a microphone, or a keyboard/keypad. The input device(s) 720 can include a touch-sensitive display or a keyboard to enable users to enter data and make requests and receive responses via web applications (e.g., in a web browser), make audio and video calls, and use the standard applications 706, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 720 and an output device 718.

INDUSTRIAL APPLICABILITY

The present disclosure relates generally to internal combustion engines with multiple fuel injectors. The internal combustion engine of the presently disclosed subject matter uses two fuel rails to provide a first fuel and a second fuel to pilot injectors and primary injectors, respectively. Switching rails allow the internal combustion engine to be reconfigured to receive first fuel into both rails, thereby facilitating one of the fuel rails as a switching rail. The internal combustion engine can use the switching rail in various instances. For example, if the second fuel becomes unavailable, the internal combustion engine can be reconfigured to supply the first fuel to the switching rails so that the internal combustion engine can maintain its operation. In another example, the second fuel may be a type of fuel that needs to be cleared from fuel rails and other components of the engine prior to shutting down the engine. In this example, during a shutdown scenario, the internal combustion engine can be configured so as to provide first fuel in the switching rails during shutdown, thereby clearing out the second fuel.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. An internal combustion engine comprising:
   a plurality of combustion cylinders, each of the plurality of combustion cylinders having a pilot injector for injecting a first fuel, from a first fuel rail, directly into each of the plurality of combustion cylinders, and a primary injector for injecting a second fuel or the first fuel, from a switching rail, directly into each of the plurality of combustion cylinders,
   a first fuel supply of the first fuel;
   a second fuel supply of the second fuel, wherein the second fuel is ignitable in the plurality of combustion cylinders based on a compression-ignition of the first fuel;
   the first fuel rail for providing the first fuel to the pilot injector of each of the plurality of combustion cylinders;
   the switching rail configured to provide either the second fuel or the first fuel to the primary injector of each of the plurality of combustion cylinders; and
   a switching valve selectable to receive and route the second fuel from a second fuel tank in a first position of the switching valve and selectable to receive and route the first fuel from a first fuel tank to primary feed lines of the switching rail in a second position of the switch valve, wherein in the first position the second fuel is provided to the switching rail rather than the first fuel, and wherein in the second position the first fuel is provided to the switching rail rather than the second fuel.

2. The internal combustion engine of claim 1, wherein the first fuel comprises diesel and the second fuel comprises methanol.

3. The internal combustion engine of claim 1, further comprising a controller configured to:
   detect a switching condition of the internal combustion engine; and
   transmit a switching signal to the switching valve to switch from an intake of the second fuel into the primary feed lines to an intake of the first fuel into the primary feed lines.

4. The internal combustion engine of claim 3, wherein the controller is further configured to:
   detect a switching condition of the internal combustion engine has cleared; and
   transmit a switching signal to the switching valve to switch from an intake of the first fuel into the primary feed lines to an intake of the second fuel into the primary feed lines.

5. The internal combustion engine of claim 3, wherein the switching condition comprises a startup of the internal combustion engine or a shutdown of the internal combustion engine.

6. The internal combustion engine of claim 3, wherein the switching condition comprises a loss of an availability of the second fuel or a selection of the first fuel as the second fuel.

7. The internal combustion engine of claim 3, wherein the controller is further configured to transmit one or more injector signals during the switching condition, wherein the switching signal instructs the pilot injector and the primary injector of each of the plurality of combustion cylinders to open and close at various times and lengths of time based on the switching condition.

8. The internal combustion engine of claim 3, wherein the controller is further configured to:
   detect a pressure of the switching rail;
   determine that the pressure is above a setpoint; and
   transmit a pressure control signal to a pressure valve to vent the switching rail.

9. The internal combustion engine of claim 1, further comprising a return valve configurable to provide unused second fuel from the switching rail to the second fuel tank or the first fuel to the first fuel tank.

10. The internal combustion engine of claim 1, further comprising a gas valve that, when opened provides an inert gas to the switching rail to force at least a portion of either the second fuel or the first fuel in the switching rail out of the switching rail.

11. A method of operating an internal combustion engine, comprising:
   monitoring, by a controller, the internal combustion engine, wherein the internal combustion engine comprises a plurality of combustion cylinders, each of the plurality of combustion cylinders having a pilot injector for injecting a first fuel, from a first fuel rail, directly into each of the plurality of combustion cylinders, and a primary injector for injecting a second fuel or the first fuel, from a switching rail, directly into each of the plurality of combustion cylinders;
   detecting, by the controller, a switching condition;
   modifying, by the controller, the switching rail from receiving second fuel to receiving the first fuel rather than receiving the second fuel;
   detecting, by the controller, that the switching condition has cleared; and
   modifying, by the controller, the switching rail from receiving the first fuel to receiving the second fuel rather than receiving the first fuel.

12. The method of claim 11, wherein the switching condition comprises a startup of the internal combustion engine, a shutdown of the internal combustion engine, or a loss of an availability of the second fuel.

13. The method of claim 11, wherein the first fuel comprises diesel and the second fuel comprises methanol.

14. The method of claim 11, wherein modifying, by the controller, a switching rail from receiving a second fuel to receiving a first fuel comprises transmitting, by the controller, a switching signal to a switching valve to switch from an intake of the second fuel into primary feed lines to an intake of the first fuel into the primary feed lines.

15. The method of claim 11, wherein modifying, by the controller, the switching rail from receiving the first fuel to receiving the second fuel comprises transmitting a switching signal to a switching valve to switch from an intake of the first fuel into primary feed lines to an intake of the second fuel into the primary feed lines.

16. The method of claim 11, further comprising:

detecting a pressure of the switching rail;

determining that the pressure is above a setpoint; and transmitting a pressure control signal to a pressure valve to vent the switching rail.

17. A controller for controlling an internal combustion engine, the controller comprising:

a memory storing computer-executable instructions; and a processor in communication with the memory, the computer-executable instructions causing the processor to perform acts comprising:

monitoring the internal combustion engine, wherein the internal combustion engine comprises a plurality of combustion cylinders, each of the plurality of combustion cylinders having a pilot injector for injecting a first fuel, from a first fuel rail, directly into each of the plurality of combustion cylinders, and a primary injector for injecting a second fuel or the first fuel, from a switching rail, directly into each of the plurality of combustion cylinders;

detecting a switching condition;

modifying the switching rail from receiving the second fuel to receiving the first fuel rather than receiving the second fuel;

detecting that the switching condition has cleared; and modifying the switching rail from receiving the first fuel to receiving the second fuel rather than receiving the first fuel.

18. The controller of claim 17, wherein the computer-executable instructions for modifying the switching rail from receiving the second fuel to receiving the first fuel comprises computer-executable instructions that, when executed by the processor, cause the processor to perform acts comprising transmitting a switching signal to a switching valve to switch from an intake of the second fuel into primary feed lines to an intake of the first fuel into the primary feed lines.

19. The controller of claim 17, wherein the computer-executable instructions for modifying a switching rail from receiving the first fuel to receiving the second fuel comprises computer-executable instructions that, when executed by the processor, cause the processor to perform acts comprising transmitting a switching signal to a switching valve to switch from an intake of the first fuel into primary feed lines to an intake of the second fuel into the primary feed lines.

20. The controller of claim 17, wherein the switching condition comprises:

a startup of the internal combustion engine;

a shutdown of the internal combustion engine;

a loss of an availability of the second fuel;

a selection of the first fuel as the second fuel;

a detection of a power level of the internal combustion engine below a setpoint; or an emission of the internal combustion engine above a setpoint.

* * * * *